United States Patent
Kasuga et al.

(10) Patent No.: US 11,085,342 B2
(45) Date of Patent: Aug. 10, 2021

(54) HONEYCOMB FILTER

(71) Applicant: NGK Insulators, Ltd., Nagoya (JP)

(72) Inventors: Ren Kasuga, Nagoya (JP); Shogo Takeno, Nagoya (JP); Kousuke Ujihara, Nagoya (JP); Takuya Nakashima, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 16/437,380

(22) Filed: Jun. 11, 2019

(65) Prior Publication Data

US 2019/0390584 A1 Dec. 26, 2019

(30) Foreign Application Priority Data

Jun. 20, 2018 (JP) .............................. JP2018-116614
Apr. 11, 2019 (JP) .............................. JP2019-075617

(51) Int. Cl.
*F01N 3/08* (2006.01)
*B01D 46/24* (2006.01)
*B01D 39/20* (2006.01)

(52) U.S. Cl.
CPC ....... *F01N 3/0821* (2013.01); *B01D 39/2068* (2013.01); *B01D 46/2429* (2013.01); *B01D 46/2474* (2013.01); *B01D 2046/2433* (2013.01); *B01D 2046/2481* (2013.01); *B01D 2279/30* (2013.01)

(58) Field of Classification Search
CPC ........ F01N 3/0821; F01N 3/28; F01N 3/2828; B01D 46/2429; B01D 2046/2481
USPC ............ 422/168, 177, 180; 55/523; 428/118
See application file for complete search history.

(56) References Cited

U.S. PATENT DOCUMENTS

2011/0239601 A1* 10/2011 Tokuda ................. F01N 3/0222
55/486
2012/0009092 A1 1/2012 Mizutani et al.

FOREIGN PATENT DOCUMENTS

| EP | 2 324 904 A2 | 5/2011 |
| EP | 2 375 021 A1 | 10/2011 |
| JP | 4426381 B2 | 3/2010 |
| JP | 5524178 B2 | 6/2014 |

(Continued)

OTHER PUBLICATIONS

German Office Action (with English translation), German Application No. 10 2019 208 675.6, dated Jan. 15, 2021 (10 pages).

*Primary Examiner* — Tom P Duong
(74) *Attorney, Agent, or Firm* — Burr & Brown, PLLC

(57) ABSTRACT

A honeycomb filter including: a honeycomb structure having a porous partition wall provided surrounding a plurality of cells; and a plugging portion disposed to seal either one end portion on the inflow or the outflow end face side of the cells, wherein the cell in which the plugging portion is provided at the outflow end face side and the inflow end face side is open is defined as an inflow cell, the cell the plugging portion is provided at the inflow end face side and the outflow end face side is open is defined as an outflow cell, the honeycomb structure further has a trapping layer for the particulate matter on an inner surface side of the partition wall, the trapping layer includes a portion composed of a sintered body of $CeO_2$ particles on at least a surface layer, and the average particle diameter is 1.1 μm or less.

7 Claims, 3 Drawing Sheets

(56) References Cited

FOREIGN PATENT DOCUMENTS

| JP | 5524179 B2 | 6/2014 |
|----|------------|--------|
| JP | 5726414 B2 | 6/2015 |

\* cited by examiner

HONEYCOMB FILTER

The present application is an application based on JP 2018-116614 filed on Jun. 20, 2018 and JP2019-075617 filed on Apr. 11, 2019 with Japan Patent Office, the entire contents of which are incorporated herein by reference.

BACKGROUND OF THE INVENTION

Field of the Invention

The present invention relates to a honeycomb filter. More specifically, the present invention relates to a honeycomb filter capable of trapping the particulate matter in an exhaust gas by a trapping layer and then oxidizing and burning the trapped particulate matter at a lower temperature.

Description of the Related Art

In recent years, the regulations concerning the removal of particulate matter contained in the exhaust gas emitted from a gasoline engine have been becoming increasingly strict worldwide. As the filters for removing the particulate matter, honeycomb filters having honeycomb structures are used. Hereinafter, the particulate matter may be referred to as the "PM". The PM stands for "particulate matter".

For example, one type of honeycomb filter includes a honeycomb structure having porous partition walls that define a plurality of cells, and plugging portions that plug either one ends of the cells. Such a honeycomb filter is structured such that the porous partition walls act as filters for removing PM. More specifically, the exhaust gas that contains PM is led through the inflow end face of the honeycomb filter to trap and filter out the PM by the porous partition walls, and then the purified exhaust gas is discharged from an outflow end face of the honeycomb filter. In this manner, the PM in the exhaust gas can be removed.

Hitherto, as a technique for improving the trap performance of a honeycomb filter, there has been proposed a technique whereby to increase the thickness of the partition walls of a honeycomb structure or decrease the size of the pores formed in the partition walls. However, improving the trap performance by the technique described above has been posing a problem in that the pores formed in the partition walls tend to be easily clogged by PM (e.g. soot), thus causing the pressure loss of the honeycomb filter to increase. In other words, it has been hard to say that the technique described above is an effective solution because the effect for improving the trap performance and the effect for suppressing an increase in the pressure loss are inconsistent with each other.

In view of the background described above, there has been proposed a honeycomb filter that has trapping layers for trapping PM, the trapping layers being provided on the surfaces of the partition walls of a honeycomb structure (refer to, for example, Patent Documents 1 to 4). For example, the trapping layers are composed of porous membranes having pores of a smaller average pore diameter than the average pore diameter of the partition walls. According to such a honeycomb filter, the PM can be accumulated on the surfaces of the trapping layers, so that the filtration efficiency for trapping the PM can be improved while suppressing a sudden increase in pressure loss caused by the PM clogging in the pores of the partition walls.

[Patent Document 1] JP Patent No. 4426381
[Patent Document 2] JP Patent No. 5524178
[Patent Document 3] JP Patent No. 5524179
[Patent Document 4] JP Patent No. 5726414

As described above, according to the honeycomb filter having the trapping layers provided on the surfaces of the partition walls, PM is less likely to clog the pores of the partition walls, thus making it possible to suppress a sudden increase in the pressure loss. The honeycomb filter, however, has been posing another problem described below, requiring countermeasures therefor. That is, in the honeycomb filter provided with the trapping layers, much soot as PM accumulates on the trapping layers, so that it is necessary to suppress the increase in the pressure loss attributable to such an accumulation layer of soot. Especially in a use environment, such as in a cold region, in which it is difficult for soot to burn, the regeneration operation of a filter has to be frequently carried out by backwashing, forced heating of soot, or the like. Further, a technique that replaces the frequently performed regeneration operation is being studied. The technique, in which the trapping layers are loaded with an oxidation catalyst and the accumulation layer of soot that has accumulated on the trapping layers is burned and removed by a catalytic reaction. In the technique, in which the accumulation layer of soot that has accumulated on the trapping layers is burned and removed by the catalytic reaction, decreasing the oxidation and burning start temperature of soot significantly contributes to the effect for suppressing an increase in the pressure loss. For this reason, there is a strong demand for developing a technique that makes it possible to oxidize and burn soot at a lower temperature.

SUMMARY OF THE INVENTION

The present invention has been made with a view of the problems with the prior art described above. The present invention provides a honeycomb filter capable of trapping the particulate matter in an exhaust gas by trapping layers and oxidizing and burning the trapped particulate matter at a lower temperature.

The present invention provides the honeycomb filter described below.

According to a first aspect of the present invention, a honeycomb filter is provided including:

a honeycomb structure having a porous partition wall provided such that the porous partition wall surrounds a plurality of cells serving as fluid through channels that extend from an inflow end face to an outflow end face; and a plugging portion disposed to seal either one end portion of the inflow end face side or the outflow end face side of each of the cells, wherein the cell in which the plugging portion is provided at the end portion on the outflow end face side and the inflow end face side is open is defined as an inflow cell, the cell in which the plugging portion is provided at the end portion on the inflow end face side and the outflow end face side is open is defined as an outflow cell, the honeycomb structure further has a trapping layer for trapping the particulate matter in an exhaust gas, the trapping layer being on an inner surface side of the partition wall surrounding the inflow cell, the trapping layer includes a portion composed of a sintered body of $CeO_2$ particles on at least a surface layer of the trapping layer, and the average particle diameter of the $CeO_2$ particles constituting the trapping layer is 1.1 μm or less.

According to a second aspect of the present invention, the honeycomb filter according to the foregoing first aspect is provided, wherein the average pore diameter of the trapping layer is smaller than the average pore diameter of the partition wall.

According to a third aspect of the present invention, the honeycomb filter according to the foregoing first or second aspects is provided, wherein the partition wall is composed of a cordierite.

According to a fourth aspect of the present invention, the honeycomb filter according to any one of the foregoing first to third aspects is provided, wherein the average pore diameter of the partition wall is 6 to 24 µm.

According to a fifth aspect of the present invention, the honeycomb filter according to any one of the foregoing first to fourth aspects is provided, wherein the porosity of the partition wall is 45 to 66%.

According to a sixth aspect of the present invention, the honeycomb filter according to any one of the foregoing first to fifth aspects is provided, wherein the thickness of the partition wall is 0.10 to 0.35 mm.

According to a seventh aspect of the present invention, the honeycomb filter according to any one of the foregoing first to sixth aspects is provided, wherein the thickness of the trapping layer is 20 to 50 µµm.

The honeycomb filter in accordance with the present invention is capable of trapping the particulate matter (PM) in an exhaust gas by trapping layers and oxidizing and burning the trapped PM at a lower temperature. More specifically, at least the surface layers of the trapping layers include the portions composed of the sintered body of $CeO_2$ particles, and the average particle diameter of the $CeO_2$ particles constituting the trapping layers is 1.1 µm or less, so that the $CeO_2$ particles exhibit the catalytic activity as an oxidation catalyst at a lower temperature. This makes it possible to oxidize and burn the PM trapped by the trapping layers at a lower temperature. The honeycomb filter in accordance with the present invention does not require frequent regeneration operations of the filter even in a use environment, such as a cold region, in which it is difficult to burn PM (especially soot). Further, the honeycomb filter in accordance with the present invention is capable of successfully oxidizing and burning PM trapped by the trapping layers without the need for loading the trapping layers with additional oxidation catalyst.

DESCRIPTION OF THE PREFERRED EMBODIMENTS

The following will describe an embodiment of the present invention; however, the present invention is not limited to the following embodiment. Therefore, it should be understood that those created by adding changes, improvements and the like to the following embodiment, as appropriate, on the basis of the common knowledge of one skilled in the art, without departing from the spirit of the present invention are also covered by the scope of the present invention.

(1) Honeycomb Filter

Figure 1:
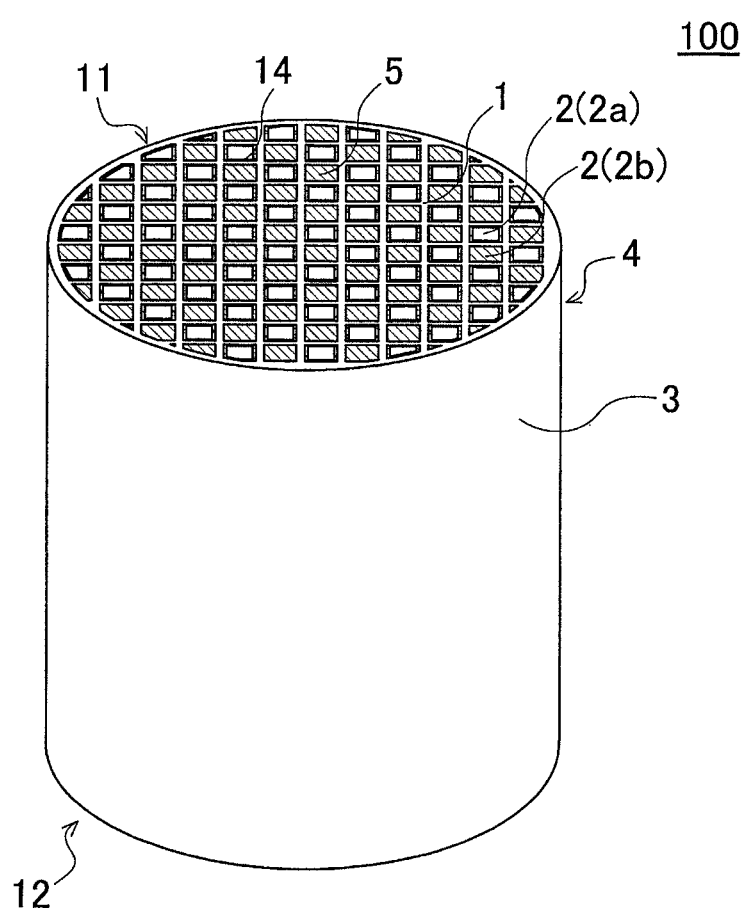
FIG. 1 is a perspective view schematically showing an embodiment of the honeycomb filter in accordance with the present invention.
Figure 2:
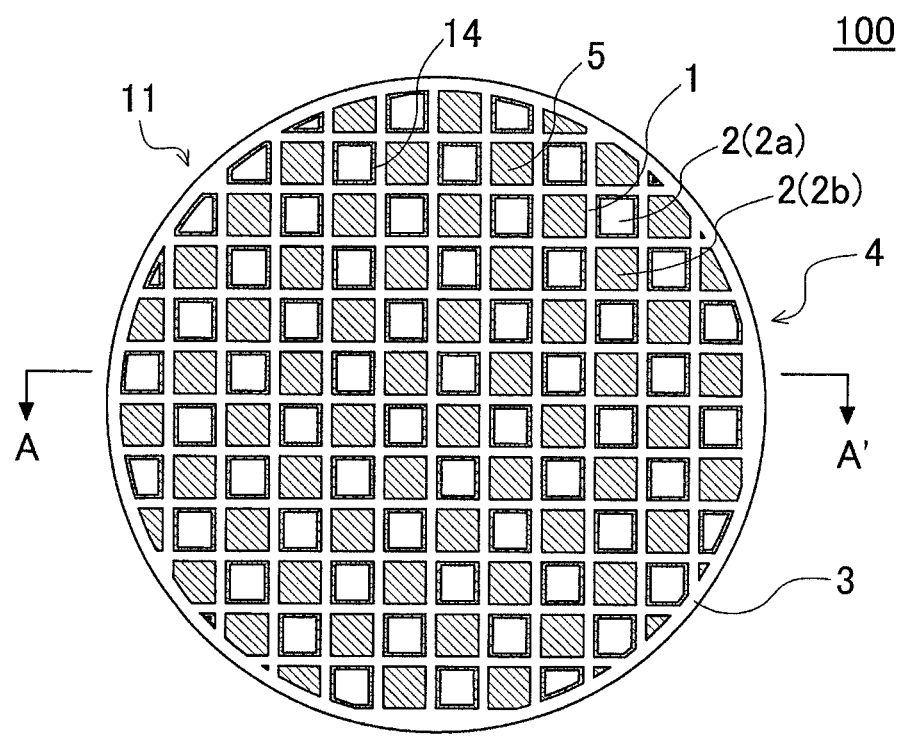
FIG. 2 is a plan view of the inflow end face side of the honeycomb filter shown in FIG. 1.
Figure 3:
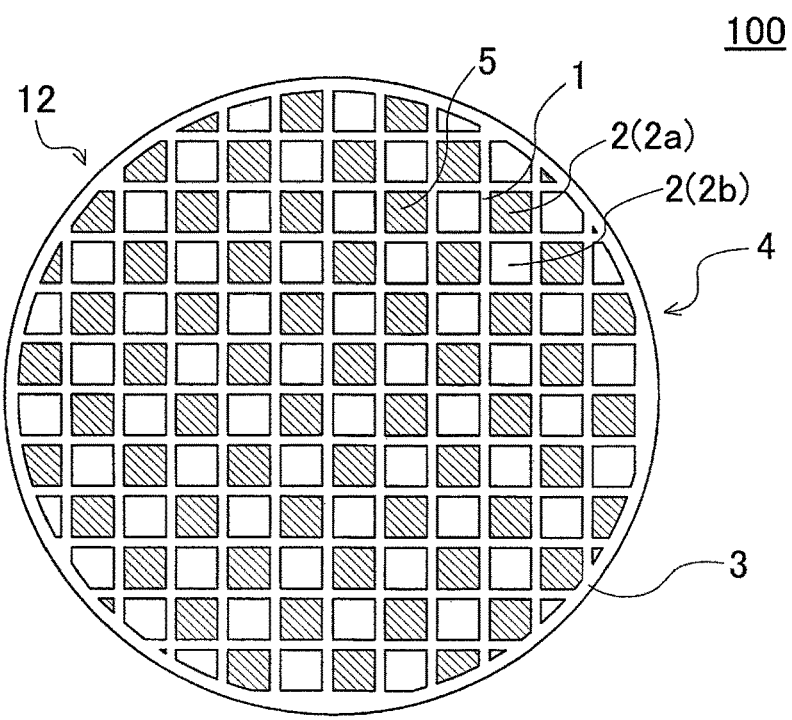
FIG. 3 is a plan view of the outflow end face side of the honeycomb filter shown in FIG. 1.
Figure 4:
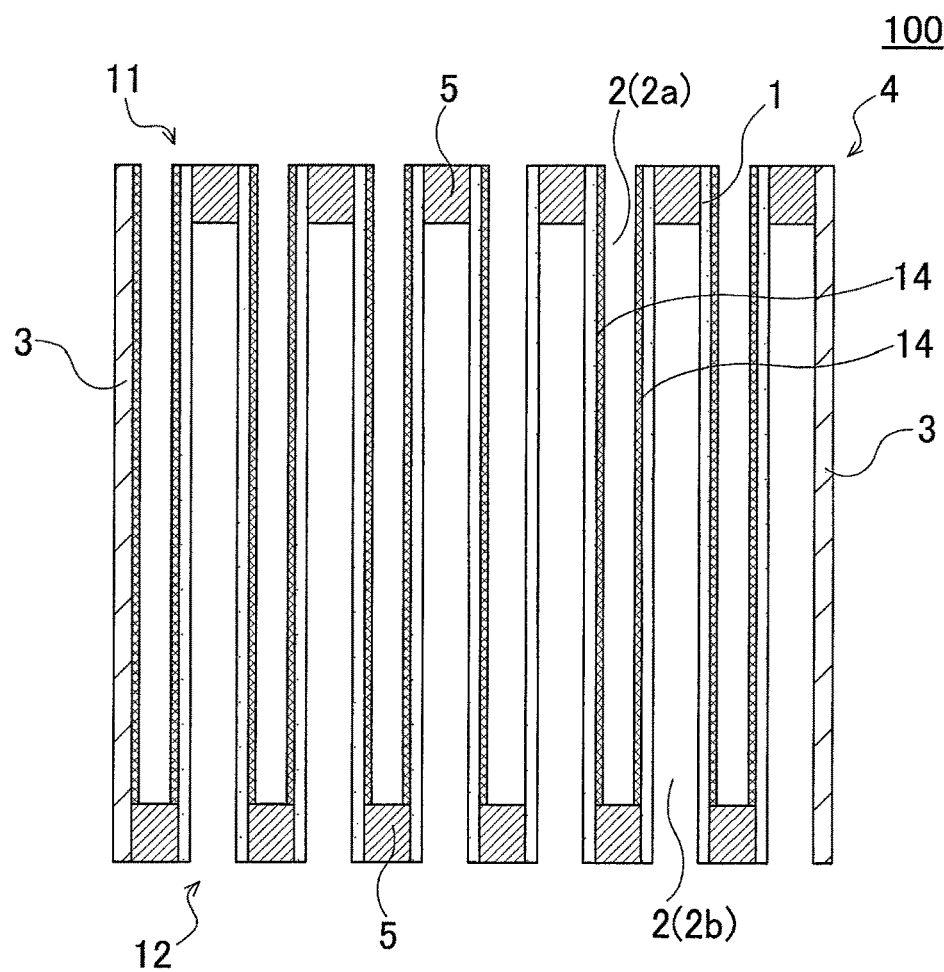
FIG. 4 is a sectional view schematically showing the section taken along A-A' of FIG. 2.

An embodiment of the honeycomb filter in accordance with the present invention is a honeycomb filter 100 shown in FIG. 1 to FIG. 4. Here, FIG. 1 is a perspective view schematically showing the embodiment of the honeycomb filter in accordance with the present invention. FIG. 2 is a plan view of the inflow end face side of the honeycomb filter shown in FIG. 1. FIG. 3 is a plan view of the outflow end face side of the honeycomb filter shown in FIG. 1. FIG. 4 is a sectional view schematically showing the section taken along A-A' of FIG. 2.

As shown in FIG. 1 to FIG. 4, the honeycomb filter 100 of the present embodiment includes a honeycomb structure 4 and plugging portions 5. The honeycomb structure 4 has partition walls 1 provided, surrounding a plurality of cells 2 which serve as fluid through channels extending from an inflow end face 11 to an outflow end face 12. The honeycomb structure 4 shown in FIG. 1 to FIG. 4 is configured in a round pillar-shape having the inflow end face 11 and the outflow end face 12 as both end faces thereof, and has a circumferential wall 3 on the outer peripheral side surface thereof. More specifically, the circumferential wall 3 is provided, surrounding the partition walls 1 arranged in a grid-like pattern.

The plugging portions 5 are disposed to seal the ends on either the inflow end face 11 side or the outflow end face 12 side of the cells 2. Hereinafter, among the plurality of cells 2, the cells 2 which are provided with the plugging portions 5 in the end portions on the outflow end face 12 side and which are open on the inflow end face 11 side will be referred to as "the inflow cells 2a." Further, among the plurality of cells 2, the cells 2 which are provided with the plugging portions 5 in the end portions on the inflow end face 11 side and which are open on the outflow end face 12 side will be referred to as "the outflow cells 2b." In the honeycomb filter 100 of the present embodiment, the inflow cells 2a and the outflow cells 2b are preferably arranged alternately with the partition walls 1 being sandwiched therebetween.

Figure 5:
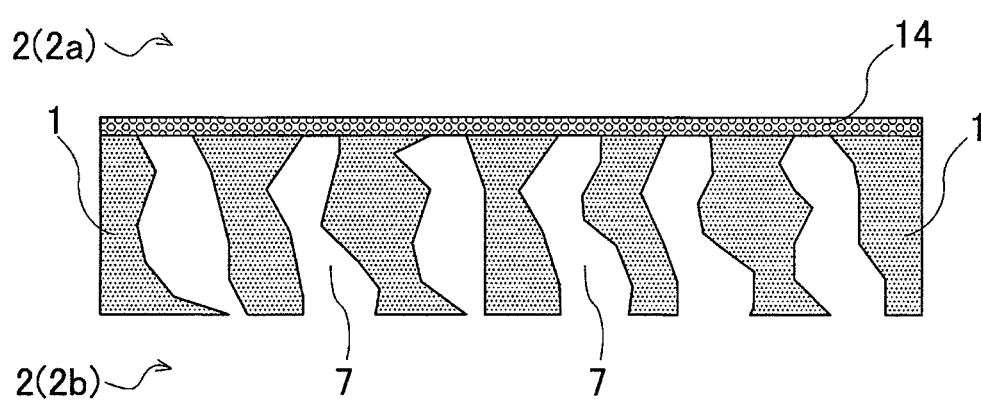
FIG. 5 is a sectional view schematically showing the section of a partition wall.

The honeycomb filter 100 is characterized by the honeycomb structure 4 being configured as described below. That is, as shown in FIG. 5, the honeycomb structure 4 further has, on the inner surface side of the partition walls 1 surrounding the inflow cell 2a, trapping layers 14 for trapping the particulate matter (hereinafter referred to as the "PM") in an exhaust gas. Further, the trapping layers 14 contain portions composed of the sintered body of the $CeO_2$ particles in at least the surface layers of the trapping layers 14. In other words, the trapping layers 14 are porous membranes that contain portions composed of the sintered body of the $CeO_2$ particles. Further, the average particle diameter of the $CeO_2$ particles constituting the trapping layers 14 is 1.1 µm or less. Here, FIG. 5 is the sectional view schematically showing the section of the partition wall. Referring to FIG. 5, reference numeral 7 denotes pores formed in the partition wall 1.

The surface layer of each of the trapping layers 14 means a portion that includes the range of 10 µm in the direction of thickness from the surface side of the trapping layer 14. Hence, the honeycomb filter 100 of the present embodiment contains the portion composed of the sintered body of the $CeO_2$ particles at least in the range of 10 µm in the direction of thickness from the surface side of the trapping layer 14. The honeycomb filter 100 of the present embodiment may be configured such that the whole trapping layer 14 contains the sintered body of the CeO₂ particles. If the whole trapping layer 14 contains the sintered body of the CeO₂ particles, then the content of the CeO₂ in the trapping layer 14 preferably exceeds 70 percent by mass. If the whole trapping layer 14 contains the sintered body of the CeO₂ particles, and the content of the CeO₂ in the trapping layer 14 is 70 percent by mass, then the trapping layer 14 may hereinafter be referred to as "the trapping layer 14 composed of the CeO₂ particles."

The average particle diameter of the CeO₂ particles constituting the trapping layers 14 being 1.1 μm or less causes the CeO₂ particles to exhibit the catalytic activity as an oxidation catalyst at a lower temperature. This makes it possible to oxidize and burn the PM trapped by the trapping layers 14 at a lower temperature. The honeycomb filter 100 of the present embodiment does not require frequent regeneration operations of the filter even in a use environment, such as a cold region, in which it is difficult to burn PM (especially soot). Further, the honeycomb filter of the present embodiment is capable of successfully oxidizing and burning PM trapped by the trapping layers 14 without the need for loading the trapping layers 14 with additional oxidation catalyst. If the average particle diameter of the CeO₂ particles constituting the trapping layers 14 exceeds 1.1 μm, then the temperature at which the CeO₂ particles exhibit the catalytic activity increases, thus making it difficult to oxidize and burn PM at a low temperature.

In the honeycomb filter 100 of the present embodiment, the average particle diameter of the CeO₂ particles constituting the trapping layers 14 can be measured as described below. First, a part of the partition wall 1 and the trapping layer 14 is cut out as a test piece from the honeycomb structure 4 constituting the honeycomb filter 100, and the test piece, which has been cut out, is embedded in a resin. Then, the test piece embedded in the resin is cut in the direction orthogonal to the extending direction of the cells 2, and the cutting surface is polished. Subsequently, the polished cutting surface is imaged using a scanning electron microscope (hereinafter referred to also as "the SEM"), and a SEM image at magnification of 200 times is obtained. "SEM" stands for "Scanning Electron Microscope." The SEM image is to be an image in which one pixel measures 0.261 μm vertically and 0.261 μm horizontally. As the scanning electron microscope, a Hitachi High-Technologies' scanning electron microscope "Model: S3400-N," for example, can be used. In the measurement of the average particle diameter of the CeO₂ particles, one test piece is taken at the central position of the honeycomb filter 100 in the extending direction of the cells 2 and in the range of 20 mm×20 mm×20 mm, including the central part that is the farthest from the circumferential wall 3 of the honeycomb filter 100. The size of the test piece to be prepared is 6 mm×6 mm×6 mm. The SEM image of the test piece prepared as described above is obtained.

Subsequently, the image processing is carried out on the trapping layer 14 in the obtained SEM image, and the particle diameters of the CeO₂ particles constituting the trapping layer 14 are measured. More specifically, first, a region of 1 μm in the direction of thickness of the trapping layer 14 and 100 μm in the horizontal direction is surrounded at a randomly selected position where the mass ratio of the CeO₂ is 70 percent or more by mass in the SEM image of the trapping layer 14. At this time, in the SEM image, the trapping layer 14 is to be horizontal with respect to the partition wall 1, and the region is specified such that the region is parallel to the horizontal line. The region specified in the SEM image as described above will be hereinafter referred to as "the specified region." The specified region in the SEM image is subjected to binarization processing by using Image-Pro 9.3.2 (trade name) of Nippon Roper K.K. The binarization processing separates the trapping layer 14 in the specified region in the SEM image into the entity parts as the sintered bodies of the CeO₂ particles and the gaps among the CeO₂ particles. The binarization processing is carried out, with one pixel mentioned above being the minimum unit. Then, the area of each part recognized as the entity part, which is the sintered body of the CeO₂ particle, is divided by a width of 1 m to measure the particle diameter of every CeO₂ particle in the specified region. The average value of the particle diameters of the CeO₂ particles that have been measured is calculated. This process is carried out in two regions, and the calculated average value is defined as the average particle diameter of the CeO₂ particles constituting the trapping layer 14.

Further, the particles that constitute the trapping layer 14 being the CeO₂ particles can be verified by the qualitative analysis described below. At the time of the SEM imaging, EDS measurement is also carried out, and the total mass ratio between the Ce element and O element is measured. If the mass ratio is 90 percent or more by mass, then the particles are regarded as the CeO₂ particles. The EDS stands for Energy Dispersive x-ray Spectroscopy.

The trapping layers 14 are preferably provided only on the inner surfaces of the partition walls 1 surrounding the inflow cell 2a. Providing the trapping layers 14 also on other than the inner surfaces of the partition walls 1 surrounding the inflow cell 2a may cause an increase in the pressure loss of the honeycomb filter 100.

The average pore diameter of the trapping layers 14 is preferably smaller than the average pore diameter of the partition walls 1. With this arrangement, the PM contained in an exhaust gas can be successfully trapped by the trapping layers 14 provided on the inner surface side of the partition walls 1 surrounding the inflow cell 2a.

The average pore diameter of the trapping layers 14 is preferably 0.5 to 15 μm, further preferably 0.5 to 8 m, and especially preferably 0.5 to 1 μm.

The porosity of the trapping layers 14 is preferably 50 to 90%, further preferably 70 to 90%, and especially preferably 80 to 90%. If the porosity of the trapping layers 14 is below 50%, then the pressure loss may increase. On the other hand, if the porosity of the trapping layers 14 exceeds 90%, then the filtration efficiency may deteriorate.

The porosity and the average pore diameter of the trapping layers 14 can be measured by the method described below. First, the sectional portion of the trapping layer 14 is observed by a scanning electron microscope to acquire a SEM image thereof. The SEM image is magnified by 200 times for the observation. Subsequently, the acquired SEM image is subjected to an image analysis thereby to binarize the entity part of the trapping layer 14 and the gap part in the trapping layer 14. Then, the percentage of the ratio of the gap part in the trapping layer 14 with respect to the total area of the entity part and the gap part of the trapping layer 14 is calculated, and the obtained value is defined as the porosity of the trapping layer 14. Separately, the gaps among the particles in the SEM image are binarized, and the sizes thereof are directly measured by a scale. Based on the measured values, the pore diameters in the trapping layer 14 are calculated. The average value of the calculated pore diameters is defined as the average pore diameter of the trapping layer 14.

The thickness of the trapping layer 14 is preferably 20 to 50 μm, further preferably 20 to 40 μm, and especially preferably 20 to 30 µm. A thickness of the trapping layer 14 below 20 µm is not preferable, because the improvable value of the filtration efficiency may become smaller. On the other hand, a thickness of the trapping layer 14 exceeding 50 µm is not preferable, because the improvement in the filtration efficiency may remain high and the pressure loss may increase.

The thickness of the trapping layer 14 can be measured by the method described below. First, the following six intersection points are determined on a section which passes through the central axis in the extending direction of the cells 2 of the honeycomb filter 100 and which is parallel to the partition walls 1. The six intersection points are the six points at which three straight lines that quarter the section in the extending direction of the cells 2 and two straight lines that trisect the section in the direction perpendicular to the extending direction of the cells 2 intersect with each other. Then, centering around each of the intersection points, a test piece that includes a region measuring 20 mm vertically and 20 mm horizontally is cut out in parallel to the section. The thickness of the test piece (i.e., the depth in parallel to the section) can be randomly decided. A pair of the inflow cell 2a and the outflow cell 2b, which are adjacent to each other, is randomly selected from the test piece, and the average value of the surface height of each cell 2 (more specifically, the surface height in the direction perpendicular to the partition wall 1 of each cell 2) is obtained in the range of approximately 8 mm in the extending direction of the cells 2 by a 3-D shape measuring instrument. Subsequently, the difference in the surface height between the inflow cell 2a and the outflow cell 2b is calculated, and the calculated result is defined as the thickness of the trapping layer 14.

The soot contained in an exhaust gas is trapped by the surface of the trapping layer 14, so that at least the outermost surface of the trapping layer 14 preferably has an oxidation catalyst function. Alternatively, the trapping layer 14 may be the trapping layer 14 composed of the $CeO_2$ particles as described above.

The average pore diameter of the partition wall 1 is preferably 6 to 24 µm, further preferably 9 to 24 µm, and especially preferably 16 to 24 µm. The average pore diameter of the partition wall 1 is a value measured by a mercury press-in method. The average pore diameter of the partition walls 1 can be measured by using, for example, Micromeritics' AutoPore 9500 (trade name). An average pore diameter of the partition wall 1 below 6 µm is not preferable, because the permeation resistance of the partition wall 1 may increase and the pressure loss may increase. An average pore diameter of the partition walls 1 that exceeds 24 µm is not preferable in the aspect of formability in the membrane forming process of the trapping layers 14.

The porosity of the partition walls 1 of the honeycomb structure 4 is preferably 45 to 66%, further preferably 52 to 66%, and especially preferably 60 to 66%. The porosity of the partition walls 1 is a value measured by the mercury press-in method. The porosity of the partition walls 1 can be measured by using, for example, Micromeritics' AutoPore 9500 (trade name). The porosity of the partition walls 1 below 45% is not preferable, because the permeation resistance of the partition walls 1 increases and the pressure loss increases. A porosity of the partition walls 1 that exceeds 66% is not preferable, because the strength may significantly deteriorate.

The thickness of the partition wall 1 of the honeycomb structure 4 is preferably 0.10 to 0.35 mm, further preferably 0.10 to 0.24 mm, and especially preferably 0.10 to 0.18 mm. The thickness of the partition wall 1 can be measured by using, for example, a profile projector. If the thickness of the partition wall 1 is below 0.10 mm, then a sufficient strength may not be obtained. On the other hand, if the thickness of the partition wall 1 exceeds 0.35 mm, then the pressure loss may increase when the trapping layer 14 is provided on the surface of the partition wall 1.

There are no particular restrictions on the shapes of the cells 2 formed in the honeycomb structure 4. For example, the shapes of the cells 2 in the section that is orthogonal to the extending direction of the cells 2 may be polygonal, circular, elliptical or the like. A polygonal shape may be triangular, quadrangular, pentagonal, hexagonal, octagonal or the like. The shapes of the cells 2 are preferably triangular, quadrangular, pentagonal, hexagonal or octagonal. Further, regarding the shapes of the cells 2, all the cells 2 may have the same shape or different shapes. For example, although not shown, quadrangular cells and octagonal cells may be mixed. Further, regarding the sizes of the cells 2, all the cells 2 may have the same size or different sizes. For example, although not shown, among the plurality of cells, some cells may be larger and some other cells may be relatively smaller. In the present invention, the cells 2 mean the spaces surrounded by the partition walls 1.

The cell density of the cells 2 defined by the partition walls 1 is preferably 30 to 60 cells/cm$^2$ and further preferably 30 to 50 cells/cm$^2$. This constitution makes the cells suitably used as the filters for trapping the PM in an exhaust gas emitted from an engine of a car or the like.

The circumferential wall 3 of the honeycomb structure 4 may be configured integrally with the partition walls 1, or may be a circumferential coating layer formed by applying a circumferential coating material to surround the partition walls 1. Although not shown, the circumferential coating layer can be provided on the circumferential side of the partition walls after the partition walls and the circumferential wall are integrally formed and the formed circumferential wall is removed by a publicly known method, such as grinding, in the manufacturing process.

There are no particular restrictions on the shape of the honeycomb structure 4. The honeycomb structure 4 may have a pillar shape, the shapes of the inflow end face 11 and the outflow end face 12 being circular, elliptical, polygonal or the like.

There are no particular restrictions on the size of the honeycomb structure 4, including, for example, the length of the honeycomb structure 4 in the extending direction of the cells 2 (hereinafter referred to also as "the full length") and the size of the section of the honeycomb structure 4 that is orthogonal to the extending direction of the cells 2 (hereinafter referred to also as "the sectional area"). These sizes may be appropriately selected such that optimum purifying performance is obtained when the honeycomb filter 100 is used. The full length of the honeycomb structure 4 is preferably 90 to 160 mm and further preferably 120 to 140 mm. In addition, the sectional area of the honeycomb structure 4 is preferably 8000 to 16000 mm$^2$ and further preferably 10000 to 14000 mm$^2$.

Preferably, the material of the partition walls 1 contains at least one selected from a group including cordierite, silicon carbide, a silicon-silicon carbide based composite material, mullite, alumina, aluminum titanate, silicon nitride, and a silicon carbide-cordierite based composite material. The material constituting the partition walls 1 is preferably a material that contains 30 percent or more by mass of the materials listed in the foregoing group, further preferably a material that contains 40 percent or more by mass, and especially preferably a material that contains 50 percent or more by mass. In the honeycomb filter 100 of the present embodiment, the material constituting the partition walls 1 is especially preferably cordierite.

(2) Method for Manufacturing the Honeycomb Filter

There are no particular restrictions on the method for manufacturing the honeycomb filter in accordance with the present invention, and the following method, for example, may be used.

First, a plastic kneaded material for producing the partition walls of the honeycomb structure is prepared. The kneaded material for producing the partition walls of the honeycomb structure can be prepared by adding an additive, such as a binder, a pore former and water, as appropriate, to a raw material powder for producing the material suitable for the foregoing partition walls. As the raw material powder, for example, alumina, talc, kaolin and silica powder can be used. Examples of the binder are methylcellulose, hydroxypropyl methylcellulose and the like. Further, examples of the additive are a surfactant and the like.

Subsequently, the kneaded material obtained as described above is subjected to extrusion so as to produce the pillar-shaped honeycomb formed body, which has partition walls that define a plurality of cells, and the circumferential wall provided, surrounding the partition walls. Then, the obtained honeycomb formed body is dried by, for example, microwave and hot air.

Subsequently, the plugging portions are formed on the dried honeycomb formed body. The plugging portions can be formed according to a conventionally known manufacturing method for a honeycomb filter. For example, first, a mask is provided at the inflow end face of the honeycomb formed body to cover the inflow cells. Thereafter, plugging slurry is rubbed into the end portion of the honeycomb formed body provided with the mask, and the open ends of the outflow cells, which have no mask, are filled with the plugging slurry. Thereafter, also for the outflow end face of the honeycomb formed body, the open ends of the inflow cells are filled with the plugging slurry according to the same method described above. After that, the honeycomb formed body with the plugging portions formed thereon is further dried by a hot air drier.

Subsequently, the honeycomb formed body with the plugging portions formed thereon is fired to produce a honeycomb filter precursor not yet provided with the trapping layers. The firing temperature and the firing atmosphere for firing the honeycomb formed body vary according to the raw material for producing the honeycomb formed body, and those skilled in the art can select a firing temperature and a firing atmosphere that are best suited for a selected material.

Subsequently, the $CeO_2$ particles for producing the trapping layers are prepared. As the $CeO_2$ particles, $CeO_2$ particles having, for example, an average particle diameter of 0.2 to 1.1 μm can be suitably used. Then, the prepared $CeO_2$ particles are processed into a slurry made by adding water, a dispersing agent, a pore former, a coagulant, and a viscosity modifier, such that the size of the agglomerated particles containing $CeO_2$ will prevent the agglomerated particles from entering the pores of the honeycomb filter precursor. The slurry is supplied from the lower side in the vertical direction of the honeycomb filter precursor set on the jig of a membrane forming device, and a permeation liquid is poured from the upper side. After a predetermined amount of the slurry has been poured, the honeycomb filter precursor is turned over together with the jig, and the jig is removed from the honeycomb filter precursor. After that, the honeycomb filter precursor with the agglomerated particles in the slurry provided on the surfaces of the partition walls is dried and fired.

Thus, the trapping layers composed of the $CeO_2$ particles are formed on the inner surface side of the partition walls surrounding the inflow cells of the honeycomb filter precursor. The honeycomb filter in accordance with the present invention can be manufactured as described above.

EXAMPLES

The following will describe the present invention further specifically in conjunction with examples; however, the present invention is not limited at all by the examples.

Example 1

First, alumina, talc, kaolin, and silica raw materials for making the partition walls of a honeycomb structure were prepared. A dispersing medium of 2 parts by mass and an organic binder of 7 parts by mass were added to the prepared alumina, talc, kaolin, and silica raw materials, and then these materials were mixed and kneaded to prepare a kneaded material. As the dispersing medium, water was used. As the organic binder, methylcellulose was used. As the dispersing agent, a surfactant was used.

Subsequently, the kneaded material was extruded by using a die for producing a honeycomb formed body so as to obtain a honeycomb formed body, the overall shape of which was a round pillar shape. The shapes of the cells of the honeycomb formed body were quadrangular.

Subsequently, the honeycomb formed body was dried by a microwave drier and further dried by a hot air drier until the honeycomb formed body was completely dried. Then, both end faces of the honeycomb formed body were cut to form the honeycomb formed body to predetermined dimensions.

Subsequently, the plugging portions were formed on the dried honeycomb formed body. More specifically, first, a mask was provided on the inflow end face of the honeycomb formed body to cover the inflow cells. After that, plugging slurry was rubbed into the end portion of the honeycomb formed body provided with the mask, and the open ends of the outflow cells not provided with a mask were filled with the plugging slurry. Then, also for the outflow end face of the honeycomb formed body, the open ends of the inflow cells were filled with the plugging slurry according to the same method described above. After that, the honeycomb formed body with the plugging portions formed thereon was further dried by a hot air drier.

Subsequently, the dried honeycomb formed body was degreased and fired to manufacture a honeycomb filter precursor not yet provided with the trapping layers.

Subsequently, the trapping layers were produced on the inner surface side of the partition walls surrounding the inflow cells of the honeycomb filter precursor according to the following method. More specifically, first, the $CeO_2$ particles having an average particle diameter of 1.3 μm were prepared. As the $CeO_2$ particles, Treibacher's cerium oxide powder was used. Then, the prepared $CeO_2$ particles were coagulated to prepare the slurry for forming the trapping layers. Next, the slurry for forming the trapping layers was supplied from the lower side in the vertical direction of the honeycomb filter precursor set on the jig of the membrane forming device, and the permeation liquid was poured from the upper side. After the predetermined amount of the slurry for forming the trapping layers has been poured, the honeycomb filter precursor was turned over together with the jig, and the jig was removed from the honeycomb filter precursor. Thereafter, the honeycomb filter precursor was dried at room temperature for 22 hours and then dried at 80° C. for 24 hours. Further, the temperature was increased to 1200° C. at a temperature increasing speed of 200° C./h, and the honeycomb filter precursor was fired at 1200° C. for two hours, thereby producing the trapping layers.

The honeycomb filter of Example 1 had a pillar shape, the shapes of the inflow end face and the outflow end face being circular. The length of the honeycomb filter in the extending direction of the cells was 127.1 mm. The diameters of the end faces of the honeycomb filter were 118.5 mm. In the honeycomb structure constituting the honeycomb filter, the thickness of the partition walls was 0.158 mm, and the cell density was 33.3 cells/cm$^2$. The porosity of the partition walls of the honeycomb structure was 48.6%.

The honeycomb filter of Example 1 had the trapping layers composed of the $CeO_2$ particles on the inner surface side of the partition walls surrounding the inflow cells. The thickness of the trapping layer was 26 μm. The total mass of the $CeO_2$ particles constituting the trapping layers was 33 g. The results are shown in the column of "Mass of $CeO_2$ particles (g)" of Table 1. Further, the mass per unit area of the trapping layer was 24 g. The results are shown in the column of "Mass of trapping layer per unit area (g/m$^2$)" of Table 1. The mass of the trapping layer per unit area means the mass per 1 m$^2$ of the porous layer which is a layer composed of the $CeO_2$ particles and which is effective as the trapping layer. The average particle diameter of the $CeO_2$ particles, which constitute the trapping layers, measured by the following measurement method was 1.1 μm. The results are shown in Table 1.

(Measurement Method for the $CeO_2$ Particles Constituting the Trapping Layers)

First, a test piece for the measurement was prepared by cutting the test piece from the honeycomb structure constituting the honeycomb filter. The test piece having a size of 6 mm×6 mm×6 mm was cut out from an area of 20 mm×20 mm×20 mm, which area was at the central position in the extending direction of the cells of the honeycomb filter and which includes a central part that is the farthest from the circumferential wall of the honeycomb filter. Next, the test piece, which had been cut out, was embedded in a resin. Then, the test piece embedded in the resin was cut in the direction perpendicular to the extending direction of the cells, and the cutting surface was polished. Subsequently, the polished cutting surface was imaged using a scanning electron microscope, and a SEM image at magnification of 200 times was obtained. The scanning electron microscope used was a Hitachi High-Technologies' scanning electron microscope "Model: S3400-N." Subsequently, the image processing was carried out on the trapping layer in the obtained SEM image, and the particle diameters of the $CeO_2$ particles constituting the trapping layer were measured. More specifically, first, a region having a size of 1 μm in the direction of thickness of the trapping layer and 100 μm in the horizontal direction was surrounded at a randomly selected position in the SEM image of the trapping layer. At this time, in the SEM image, the trapping layer was horizontal with respect to the partition walls of the honeycomb structure, and the region was specified such that the region was parallel to the horizontal line. The region was subjected to binarization processing by using "Image-Pro 9.3.2 (trade name)" of Nippon Roper K.K. Next, the area of each part recognized as the entity part as the sintered body of the $CeO_2$ particles was divided by a width of 1 μm, thereby measuring the particle diameter of every $CeO_2$ particle in the specified region. The average value of the measured particle diameters of the $CeO_2$ particles was calculated. The process was carried out in two regions, and the calculated average value was defined as the average particle diameter of the $CeO_2$ particles constituting the trapping layer.

TABLE 1

| | Partition Wall | | | Trapping Layer | | | | | |
| | | | | $CeO_2$ Particle | | | | | |
| | Thickness (mm) | Porosity (%) | Average pore dia. (μm) | Average particle dia. [Raw material] (μm) | Average particle dia. [Trapping layer] (μm) | Thickness (μm) | Mass of $CeO_2$ particle (g) | Mass of trapping layer per unit area (g/m$^2$) | Soot oxidation start temp. (° C.) |
|---|---|---|---|---|---|---|---|---|---|
| Example 1 | 0.158 | 48.6 | 12.9 | 1.3 | 1.1 | 26 | 33 | 24 | 464 |
| Example 2 | 0.158 | 48.6 | 12.9 | 0.6 | 0.7 | 25 | 29 | 21 | 455 |
| Comparative example 1 | 0.158 | 48.6 | 12.9 | 1.9 | 2.1 | 26 | 35 | 25 | 467 |
| Comparative example 2 | 0.158 | 48.6 | 12.9 | 3.7 | 4.5 | 27 | 33 | 24 | 469 |
| Comparative example 3 | 0.158 | 48.6 | 12.9 | 5.1 | 5.5 | 30 | 31 | 22 | 468 |

On the honeycomb filter of Example 1, the measurement of "Soot oxidation start temp. (° C.)" was carried out according to the method described below. The results are shown in Table 1.

(Soot Oxidation Start Temperature (° C.))

First, an exhaust gas containing soot was passed through the honeycomb filter of each example, and the soot in the exhaust gas was trapped by the trapping layers of the honeycomb filter. The exhaust gas was passed through the trapping layers until the amount of the soot trapped by the trapping layers reached 1 g per 1 L volume of the honeycomb filter. Then, the partition wall and the trapping layer of each honeycomb filter was cut such that one side was 0.5 to 1.5 cm long to make a test piece for measuring the soot oxidation start temperature. Since the soot had adhered to the surfaces of the trapping layers, the test piece was made, giving attention to not causing the soot to be detached from the surfaces of the trapping layers. Then, each prepared test piece was subjected to Temperature Programmed Desorption-Mass Spectrometry (TPD-MS). More specifically, first, each prepared test piece was placed in a measurement cell for the TPD-MS, and a He/$O_2$ (20%) gas having the flow rate thereof regulated to 50 mL/min. was made to flow through the measurement cell. After the temperature in the measurement cell was increased to 300° C., the temperature in the measurement cell was further increased to 700° C. at a temperature increasing speed of 20° C./min. At this time, the concentration of $CO_2$ in the gas discharged from the measurement cell was measured. That means, the rising temperature in the measurement cell caused the soot trapped by the trapping layers to burn, generating $CO_2$. Based on the measurement results of the $CO_2$ concentration, a graph in which the axis of abscissas indicates the temperature in the measurement cell (200 to 700° C.) and the axis of ordinates indicates the $CO_2$ concentration (arbitrary unit (a.u.)) was made. The total area of $CO_2$ concentration peak was denoted by $A_{100\%}$, and the temperature at which the area ratio of the $CO_2$ concentration peak reached 20%, i.e., $A_{20\%}$, was determined. The temperature at which $A_{20\%}$ was reached was defined as Soot oxidation start temperature (° C.).

Example 2 and Comparative Examples 1 to 3

Honeycomb filters were produced according to the same method as that for Example 1 except that the average particle diameters of the $CeO_2$ particles for forming the trapping layers were changed as shown in Table 1. The average particle diameters of the $CeO_2$ particles constituting the trapping layers of the honeycomb filters of Example 2 and Comparative examples 1 to 3 were measured, and the average particle diameter of Example 2 was 0.7 m, the average particle diameter of Comparative example 1 was 2.1 µm, the average particle diameter of Comparative example 2 was 4.5 µm, and the average particle diameter of Comparative example 3 was 5.5 µm. The configurations of the partition walls and the trapping layers in the honeycomb filters of Example 2 and Comparative examples 1 to 3 are shown in Table 1.

On the honeycomb filters of Example 2 and Comparative examples 1 to 3 also, the measurement of Soot oxidation start temperature (° C.) was carried out according to the same method as that for Example 1. The results are shown in Table 1.

(Result)

It was verified that the soot oxidation start temperature of the honeycomb filter of Example 1 was 464° C., which was lower than the soot oxidation start temperatures of the honeycomb filters of Comparative examples 1 to 3. Further, the soot oxidation start temperature of the honeycomb filter of Example 2 was 455° C., verifying that the soot oxidation start temperature was even lower. From the results described above, it has been found that flammable PM, such as soot, trapped by the trapping layers can be oxidized and burned at a lower temperature by setting the average particle diameter of the $CeO_2$ particles constituting the trapping layers to 1.1 µm or less.

INDUSTRIAL APPLICABILITY

The honeycomb filter in accordance with the present invention can be used as a filter for trapping particulate matter in an exhaust gas.

DESCRIPTION OF REFERENCE NUMERALS

1: partition wall; 2: cell; 2*a*: inflow cell; 2*b*: outflow cell; 3: circumferential wall; 4: honeycomb structure; 5: plugging portion; 7: pore; 11: inflow end face; 12: outflow end face; 14: trapping layer; and 100: honeycomb filter.

What is claimed is:
1. A honeycomb filter comprising:
   a honeycomb structure having a porous partition wall provided such that the porous partition wall surrounds a plurality of cells serving as fluid through channels that extend from an inflow end face to an outflow end face; and
   a plugging portion disposed to seal either one end portion on the inflow end face side or the outflow end face side of each of the cells,
   wherein the cell in which the plugging portion is provided at the end portion on the outflow end face side and the inflow end face side is open is defined as an inflow cell,
   the cell in which the plugging portion is provided at the end portion on the inflow end face side and the outflow end face side is open is defined as an outflow cell,
   the honeycomb structure further has a trapping layer for trapping the particulate matter in an exhaust gas, the trapping layer being on an inner surface side of the partition wall surrounding the inflow cell,
   the trapping layer includes a portion composed of a sintered body of $CeO_2$ particles on at least a surface layer of the trapping layer, and
   the average particle diameter of the $CeO_2$ particles constituting the trapping layer is 1.1 µm or less.
2. The honeycomb filter according to claim 1, wherein the average pore diameter of the trapping layer is smaller than the average pore diameter of the partition wall.
3. The honeycomb filter according to claim 1, wherein the partition wall is composed of a cordierite.
4. The honeycomb filter according to claim 1, wherein the average pore diameter of the partition wall is 6 to 24 µm.
5. The honeycomb filter according to claim 1, wherein the porosity of the partition wall is 45 to 66%.
6. The honeycomb filter according to claim 1, wherein the thickness of the partition wall is 0.10 to 0.35 mm.
7. The honeycomb filter according to claim 1, wherein the thickness of the trapping layer is 20 to 50 µm.

* * * * *